Aug. 15, 1967  F. A. WILLIAMS ET AL  3,335,651
DRIVE MECHANISM FOR ROTATABLE FLASH ATTACHMENT
Filed March 10, 1965  2 Sheets-Sheet 1

FRANCIS A. WILLIAMS
FRANKLIN D. KOTTLER
INVENTORS

BY *R. Frank Smith*
*Thomas R. Lampe*

ATTORNEYS

Aug. 15, 1967     F. A. WILLIAMS ET AL     3,335,651
DRIVE MECHANISM FOR ROTATABLE FLASH ATTACHMENT
Filed March 10, 1965     2 Sheets-Sheet 2
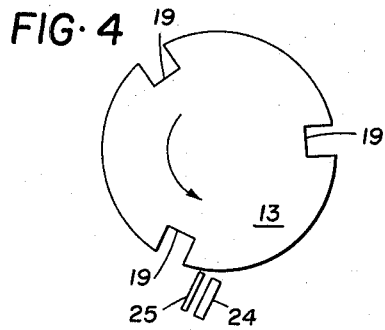
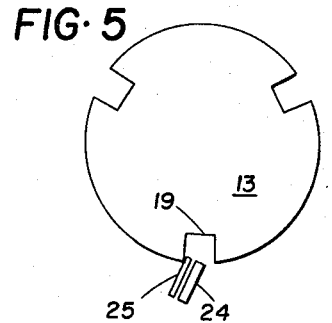
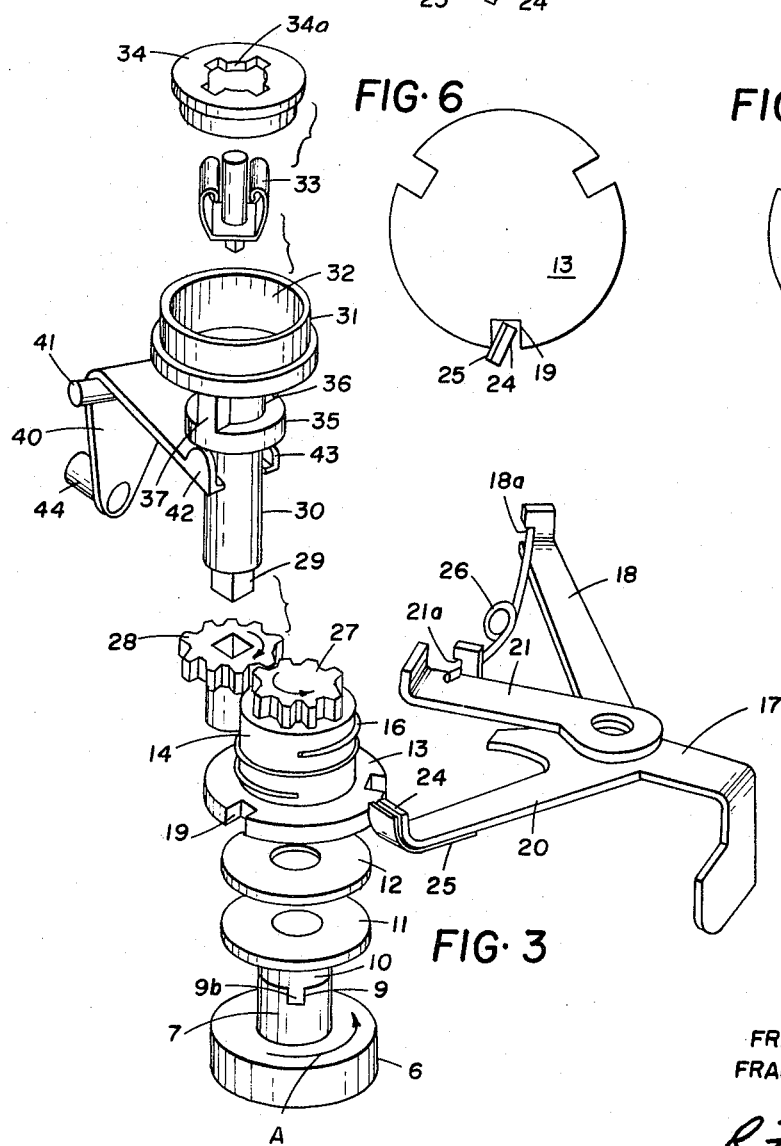
FRANCIS A. WILLIAMS
FRANKLIN D. KOTTLER
INVENTORS
BY R. Frank Smith
Thomas R. Lampe
ATTORNEYS

United States Patent Office 3,335,651
Patented Aug. 15, 1967

3,335,651
DRIVE MECHANISM FOR ROTATABLE FLASH ATTACHMENT
Francis A. Williams and Franklin D. Kottler, Rochester, N.Y., assignors to Eastman Kodak Company, Rochester, N.Y., a corporation of New Jersey
Filed Mar. 10, 1965, Ser. No. 438,585
13 Claims. (Cl. 95—11)

ABSTRACT OF THE DISCLOSURE

A drive means in photographic roll film cameras for multilamp flash units comprising a slip clutch mechanism interconnecting the rotatable lamp socket and the film winding mechanism.

---

This invention relates to flash photography and more particularly to a drive means for a disposable, multilamp flash attachment. An attachment of this type is shown in copending Kottler et al. U.S. application Ser. No. 417,914, filed on Dec. 14, 1964. In the case of a roll film camera, the invention comprises means for automatically rotating a flash attachment having a series of flash lamp elements or bulbs therein so that an unused flash lamp element is presented when the film is advanced to an unexposed frame and the film is simultaneously wound onto a takeup spool.

In roll film cameras, the amount of rotation of the film take-up spool is dependent upon the number of frames that have been wound on the spool. However, it is of course necessary in a device of this type that the unused bulbs be properly oriented so that the flash furnishes the desired illumination to the scene selected to be photographed. Where the rotatable flash attachment is mounted on a roll film camera and is cube shaped, for example, with four bulbs to be utilized, a rotation of ninety degrees must be effected upon advancement of the film. In this manner an unused bulb and its associated reflector will always face toward the front of the camera until all four bulbs are exhausted.

It is therefore an object of this invention to provide a means whereby a rotatable multilamp flash attachment is automatically advanced so that an unused bulb associated therewith is oriented to provide the scene to be photographed with light from the bulb.

Another object is to employ a mechanism whereby the winding of the film in a roll film camera by the operator simultaneously rotates the rotatable flash attachment.

A still further object of this invention is to precisely orient the rotatable flash attachment so that an unused bulb is positioned for maximum efficiency regardless of the degree of rotation of the film winding spool.

The above objectives have been attained by providing a mechanical linkage between the film winding spool of a roll film camera and a rotatable socket for receiving a multilamp flash attachment, whereby movement of the winding spool to position an unexposed frame of photographic film for exposure will simultaneously advance the flash attachment to the desired position.

Other objects of the invention will appear from the following description, reference being made to the accompanying drawings, wherein:

FIG. 3 is a partially exploded isometric view of the operating elements of the drive means disclosed in FIG. 2;

FIGS. 4–7 are schematic drawings showing the relative positions of the escapement disc and escapement lever during various stages of operation of the drive means of FIG. 2.

Figure 1:
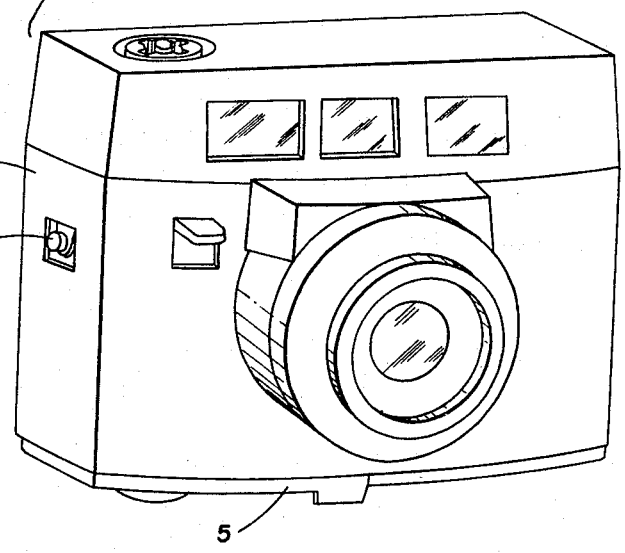
FIG. 1 is an isometric view of a camera having associated therewith a rotatable disposable multilamp flash attachment showing the attachment prior to insertion in the camera socket.

Referring to FIG. 1, there is shown a conventional camera 1 and a rotatable flash attachment 2 removably attachable thereto. The attachment is more fully disclosed in the aforementioned copending Kottler et al. U.S. application Ser. No. 417,914. Essentially, the flash attachment 2 comprises a disposable cube-shaped element, with each vertical surface thereof having a concave, reflective surface 3 in front of which is disposed a conventional flash bulb 4. As is described in said copending application, the base portion of the attachment has a plurality of lugs thereon for insertion into correspondingly shaped recesses in the receiving socket of the camera. As also described therein, suitable electrical contacts are provided for properly igniting the desired flash lamp. Camera 1 employs a conventional film winding lever 5 both for advancing the film in the manner well known in the art and, in accordance with the invention, for simultaneously positioning the rotatable flash attachment 2 in the manner described below. The present invention, however, may be utilized with any form of film advancement means.

Figure 2:
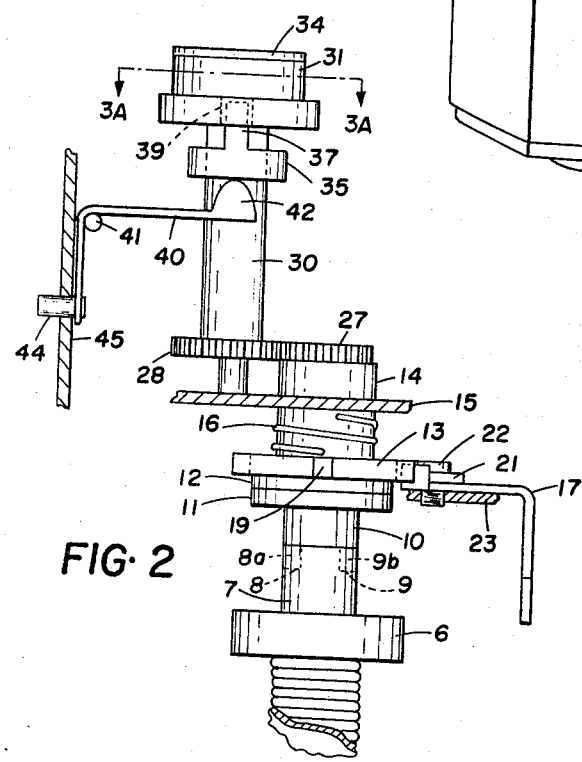
FIG. 2 is a front, partial sectional view of the drive means of the invention.
Figure 3A:
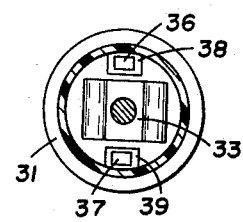
FIG. 3A is an enlarged partial, sectional view taken along line 3A—3A of FIG. 2 showing elements of the rotatable flash assembly ejector means.

Referring now to FIGS. 2 and 3, a film drive spool 6, constituting a portion of the usual film-advancing mechanism, is mounted for rotational movement in the camera housing in a conventional manner. It is of course understood that as the drive spool rotates in the direction of arrow A as seen in FIG. 3, exposed film is wound onto the spool and an unexposed frame is advanced to the exposure position in the usual manner. Rigidly secured to the topmost portion of drive spool 6 is an elongated member 7 having a pair of opposed slots 8 and 9 therein. In abutting relation with the upper face of elongated member 7 is a first shaft 10 having a pair of spaced arms 8a and 9a adapted to seat securely in slots 8 and 9. Shaft 10 has rigidly attached thereto an enlarged clutch plate 11 and a clutch disc 12. Clutch disc 12 is affixed to clutch face 11 by any suitable means such as by glue or heat sealing and is constructed of any suitable material such as neoprene or other plastic substance.

An escapement disc 13 having a series of notches 19 in the outer periphery thereof is disposed above said clutch disc 12 and is rigidly connected to a second shaft 14 which is mounted for rotational movement by any suitable means on mounting plate 15 within the camera housing. A compression spring 16 is disposed between mounting plate 15 and escapement disc to urge said disc into axial frictional engagement with clutch disc 12. It may be seen that clutch plate 11, clutch disc 12 and escapement disc 13 taken together constitute a slip clutch mechanism.

Disposed adjacent to escapement disc 13 is a pivoted escapement lever 17. As may most clearly be seen with reference to FIG. 3, escapement lever 17 is comprised essentially of a power arm 18 and a control arm 20. Escapement lever 17 is disposed below an escapement mounting plate 21 which is affixed to the camera housing in any suitable manner. Screw means 22 extends through escapement mounting plate 21 and escapement lever into housing plate 23 which is attached to the camera housing. Escapement lever 17 is free to rotate about said screw means with respect to escapement plate 21.

Referring once again to FIG. 3, control arm 20 has an upturned portion 24 on the outermost end thereof. Affixed to the bottom of arm 20 by any suitable means such as spot welding is an escapement spring 25. Escapement spring 25 at its outermost extent is free of engagement with said control arm but substantially follows the configuration thereof, being separated slightly from upturned portion 24 when in its normal unstressed position for a purpose to be more clearly brought out below. A two-armed coil spring 26 is affixed to the camera housing by any suitable means (not shown) so that the coil portion thereof is fixedly positioned and the arms thereof have freedom of movement. One arm of coil spring 26 is received in escapement plate notch 21a of escapement plate 21 and the other arm thereof is received in power arm notch 18a of power arm 18. In this manner escapement lever 17 is continuously biased in a clockwise direction as viewed in FIG. 3.

Rigidly affixed to the top of second shaft 14 is a pinion 27 which drives a gear 28, said gear being rotatably mounted in mounting plate 15 by any suitable means (not shown). As may be most clearly seen in FIG 3, gear 28 has a square-shaped socket in the uppermost portion thereof which is adapted to receive a correspondingly shaped male member 29 integrally formed on the lower end of spindle 30. An enlarged head 31 is attached to the opposite end of spindle 30 to receive a portion of the rotatable flash element. A circular recess 32 in said enlarged head accommodates a two-armed, spring retention clip 33 and an outer button 34 having an aperture 34a therein. The mode of operation of the retention clip and the outer button is more clearly set forth in copending Peterson et al. U.S. application Ser. No. 417,913, filed on Dec. 14, 1964. Briefly, the rotatable flash element 2 has an element associated therewith which extends through aperture 34a and is engaged by the retention clip 33 to releasably maintain the rotatable flash attachment in a properly oriented position.

Mounted for free sliding movement on spindle 30 is a rider ring 35 which has a pair of upstanding ejector arms 36 and 37 integrally attached thereto. As may most clearly be seen in FIG. 3A, arms 36 and 37 extend into slots 38 and 39, respectively, which are located in enlarged head 31. A two-armed ejector actuator lever 40 is mounted for pivotal movement about pin 41 which extends from the camera housing wall. One arm of the ejector actuator lever 40 is forked at its outer extremity and has two bearing members 42 and 43 affixed thereto in opposed relation on either side of spindle 30. The other arm of ejector actuator lever 40 has a button member 44 attached thereto which extends through a hole in camera housing wall 45 (FIGS. 1 and 2).

The operation of the invention will now be described. Assuming that a flash is desired to supplement the scene light while taking a picture, a rotatable flash attachment will be mounted on the camera in the manner described above. The flash attachment will be properly oriented with respect to the front of the camera in the following manner. Drive spool 6 will be rotated in the direction of arrow A to advance a frame of unexposed film to the proper location in the customary manner. Escapement disc 13 will also rotate in the direction of arrow A due to its frictional engagement with clutch disc 12 under the influence of compression spring 16. Pivoted escapement lever 17, as previously described, is biased by coil spring 26 so that control arm 20 and the associated escapement spring 25 abut against the periphery of escapement disc 13. As may most clearly be seen with reference to FIGS. 4–7, arm 20 and spring 25 are positioned with their axes at a slight angle to the tangent at the point of contact on escapement disc 13.

As the escapment disc 13 rotates, a notch 19 will be carried around to the general vicinity of spring 25 and upturned portion 24 as seen in FIG. 4. Continued rotation of the disc causes the trailing edge of notch 19 to catch spring 25, causing it to flatten against the upturned portion 24, as seen in FIG. 5, thus allowing the two elements to enter slot 19 under the influence of coil spring 26 (FIG. 6). The rotational movement of escapement disc 13 is thus halted. Drive spool 6 continues to rotate until the film is properly positioned since clutch face 11 and clutch disc 12 are capable of moving relative to escapement disc 13. Cessation of the movement of disc 13 results in the stoppage of the rotational mechanism of the rotatable flash attachment. When the operator has taken a picture, it is once again necessary for film to be advanced and the rotatable flash attachment to be rotated the proper amount. To accomplish this it is necessary that escapement lever 17 be cleared from notch 19 so that the escapement disc 13 may once again rotate until the subsequent notch 19 is engaged. Any suitable mechanism may be employed to engage and rotate the lever 17 in a counterclockwise direction (as seen in FIG. 3) against the bias of spring 26. For example, a cam or lever means may be operatively associated with the shutter operating mechanism (not shown) whereby the escapement lever 17 is rotated to withdraw upturned portion 24 and spring 25 from notch 19 as the picture is taken. Once free of the confines of notch 19, spring 25 resumes its normal unstressed position as shown in FIG. 7, thus rendering the operational width of elements 24 and 25 too great to reenter into the notch just occupied by them. The escapement disc is now free to rotate and the cycle is again repeated so that the rotatable flash attachment is properly indexed.

It should be noted that the escapement disc 13 as shown has three indexing notches 19 therein. The disc therefore rotates 120° for each cycle of operation. To properly index the rotatable flash attachment at 90° increments it is thus necessary to provide a 4:3 gear ratio between gear 28 and pinion 27. After all four bulbs of the rotatable flash attachment have been exhausted the attachment may be ejected by depressing button 44 thereby causing ejector arms 36 and 37 to enter recess 32 of enlarged head 31. Ejector arms 36 and 37 will then contact a portion of rotatable flash attachment 2 to release the attachment from the grasp of retention clip 33. Upon removal of the exhausted attachment, a new one may be inserted.

The invention has been described in detail with particular reference to a preferred embodiment thereof, but it will be understood that variations and modifications can be effected within the spirit and scope of the invention as described hereinabove and as defined in the appended claims. For example, it is possible for an electric or spring motor means to be substituted for the manual means disclosed in the instant case. Alternatively, a rotatable flash attachment of any desired configuration may be substituted for the cube-shaped attachment, with corresponding revision of the drive means. For example, the gear ratio of the transmission elements or the number of indexing notches in the escapement disc might be varied to increase or decrease the degree of rotation.

The embodiments of the invention in which an exclusive property or privilege is claimed are defined as follows:

1. For use with a roll film camera having film advancing means including a rotatable drive spool onto which exposed frames of roll film are wound, a flash drive mechanism comprising:
   socket means to receive a detachable flash attachment containing a plurality of flash bulbs, the socket means being movable to move the attachment therewith for sequentially placing the flash bulbs in operative position,
   a slip clutch assembly interconnecting the film advance drive spool and socket means to move the socket means in response to rotation of the drive spool, and
   escapement means to stop movement of the socket means after the socket means has moved a predetermined amount to place a flash bulb in operative position, while permitting further rotation of the drive spool an indeterminant amount to complete film advancement.

2. A flash drive mechanism according to claim 1 and comprising means responsive to camera operation to withdraw the escapement means for further movement of the socket means through a predetermined amount in response to movement of the drive spool to place a subsequent flash bulb in operative position.

3. A flash drive mechanism according to claim 1 wherein the socket means comprises a rotatable socket and the slip clutch assembly comprises first and second frictionally-engaged movable clutch elements connected respectively to the socket and to the drive spool.

4. A flash drive mechanism according to claim 3 wherein the first clutch element connected to the socket includes at least one notch and the escapement means comprises a movable arm engageable with the notch to terminate rotation of the first clutch element and the socket.

5. The flash drive mechanism according to claim 4 wherein the escapement means includes means responsive to camera operation to withdraw the arm from the notch and prevent reengagement with the notch until after rotation of the socket through rotation of the drive spool.

6. In a camera of the type having a film advancing means movable from a first position to a second position for advancing film in said camera, the combination comprising: an indexable flash attachment associated with said camera and having a plurality of flash bulbs mounted therein to be indexed through a series of positions in each of which a respective flash bulb is operatively associated with the camera, a yieldable drive means comprising a slip clutch mechanism operatively associated with said film advancing means for indexing said flash attachment in response to movement of said film advancing means from said first position to said second position, a control means operatively associated with said yieldable drive means to limit the movement thereof thereby limiting the degree of indexing of said flash attachment, said control means comprising an escapement disc having notches on the outer periphery thereof and a reciprocating member for selectively engaging said notches in sequential fashion.

7. The combination according to claim 6, wherein said flash attachment is cube-shaped with four concave, reflective surfaces therein, each of said surfaces having a flash bulb mounted therein for selective advancement toward the front of said camera.

8. The combination according to claim 6, wherein said yieldable drive means additionally comprises a pinion driven in accordance with the degree of movement of said film advancing means, a gear means driven by said pinion, a spindle operatively associated with said gear means for movement therewith and having a recessed portion in the upper end thereof for receiving said flash attachment.

9. The combination according to claim 8 wherein ejector means is operatively associated with said spindle to eject said flash attachment from said recessed portion.

10. The combination according to claim 9 wherein said ejector means comprises a rider ring mounted for free sliding movement on said spindle, said rider ring having a pair of upwardly extending arms thereon, said arms movable from a first position to a second position, said arms when in said first position being clear of said recess and when in said second position entering into said recess, a two-armed ejector actuator lever pivotally mounted adjacent said spindle, one arm of said ejector actuator lever being forked at its outer extremity and having bearing means affixed thereto on opposed sides of said spindle, the other arm of said ejector actuator lever having a manually depressible element thereon, said manually depressible element when depressed causing said ejector actuator lever to pivot, thereby causing said bearing means to force said rider ring to move in an upward direction and said arms to move from their first position to their second position.

11. The combination according to claim 6, wherein said reciprocating member comprises an arm having a substantially vertical portion at one extremity thereof, biasing means operatively associated with said arm to bias said substantially vertical portion toward said escapement disc.

12. The combination according to claim 11, wherein a spring element is attached to said one extremity and closely follows the configuration of said substantially vertical portion but in its normal unbiased state is separated slightly therefrom, said spring element and substantially vertical protion having an operational width greater than the width of any of said notches when said spring element is in its normal unbiased state, thereby rendering said spring element and substantially vertical portion incapable of entering into any of said notches when said spring is in its normal unbiased state.

13. The combination according to claim 12, wherein each of said notches has means associated therewith to engage said spring element to bias same against the substantially vertical portion thereby decreasing the operational width of said spring element and said substantially vertical portion and allowing said spring element and substantially vertical portion to selectively enter each of said notches under the influence of said biasing means.

References Cited
UNITED STATES PATENTS

| | | |
|---|---|---|
| 3,087,318 | 4/1963 | Oswold. |
| 3,107,862 | 10/1963 | Moore et al. 240—1.3 |
| 3,244,087 | 4/1966 | Anderson et al. 95—11 |

NORTON ANSHER, *Primary Examiner.*

F. L. BRAUN, *Assistant Examiner.*